United States Patent
Schuh

(10) Patent No.: US 7,272,989 B2
(45) Date of Patent: Sep. 25, 2007

(54) STEERING SHAFT BEARING ASSEMBLY

(75) Inventor: Steven John Schuh, Renton, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 11/112,239

(22) Filed: Apr. 21, 2005

(65) Prior Publication Data
US 2006/0236803 A1  Oct. 26, 2006

(51) Int. Cl.
*B62D 1/16* (2006.01)
(52) U.S. Cl. .................................. 74/492
(58) Field of Classification Search ........... 74/492, 74/493; 384/215, 220, 222, 275, 296, 276, 384/906, 295, 280
See application file for complete search history.

(56) References Cited

U.S. PATENT DOCUMENTS

| | | | |
|---|---|---|---|
| 1,555,214 A | 9/1925 | Johnson | |
| 3,214,994 A | 11/1965 | Tolan, Jr. | |
| 3,300,229 A | 1/1967 | Kishline | |
| 3,643,981 A | 2/1972 | Grandel et al. | |
| 3,829,184 A * | 8/1974 | Chevret | 384/280 |
| 3,877,319 A | 4/1975 | Cooper | |
| 4,895,391 A | 1/1990 | Groat | |
| 5,669,718 A * | 9/1997 | Sakairi et al. | 384/220 |
| 5,816,615 A | 10/1998 | Dupont et al. | |
| 6,056,297 A * | 5/2000 | Harkrader et al. | 277/634 |
| 6,148,687 A * | 11/2000 | Kurita | 74/492 |
| 6,435,555 B1 * | 8/2002 | Seamon et al. | 280/777 |
| 6,769,507 B2 * | 8/2004 | Murakami et al. | 180/444 |
| 6,802,648 B2 * | 10/2004 | Merot et al. | 384/215 |
| 2003/0002758 A1 * | 1/2003 | Wyer | 384/295 |

* cited by examiner

*Primary Examiner*—Richard Ridley
*Assistant Examiner*—Matthew A. Johnson
(74) *Attorney, Agent, or Firm*—Christensen O'Connor Johnson Kindness PLLC

(57) ABSTRACT

A steering shaft bearing assembly (100) for a vehicle having a steering shaft (102). The steering shaft bearing assembly includes a bearing (108) having a bore (112) adapted to receive the steering shaft and a support body (120) having an outer surface (124) and a passageway (126) passing through the support body. The bearing is at least partially disposed in the passageway so as to be suspended by the support body in the passageway in a predetermined position. The support body comprises a flexible material for permitting the bearing to move from the predetermined position. About 50% or more of the outer surface of the support body is free of a rigid support structure for restricting movement of the support body when coupled to the vehicle during operation.

23 Claims, 4 Drawing Sheets

US 7,272,989 B2

STEERING SHAFT BEARING ASSEMBLY

FIELD OF THE INVENTION

The illustrated embodiment of the present invention generally relates to steering shaft bearing assemblies, and more specifically, to steering shaft bearing assemblies using flexible materials for permitting a steering shaft to move from a predetermined position.

BACKGROUND OF THE INVENTION

Automotive vehicles typically employ a steering shaft between the steering column and steering gear for the purpose of transmitting rotational motion of the steering wheel to the steering gear. The steering shaft is often interfaced with a steering shaft bearing assembly for providing support for the steering shaft as it rotates.

One previously developed steering shaft bearing assembly is described in U.S. Pat. No. 4,895,391, issued to Groat (hereinafter "Groat"). Although somewhat effective at its intended purpose, the steering shaft bearing assembly is not without its problems. For instance, referring to FIGS. 4 and 5 of Groat, the steering shaft bearing assembly 6 includes a large number of separable parts which make installation and removal a laborious process. Moreover, the steering shaft bearing assembly 6 includes a first mounting bracket 56, a second mounting bracket 60, a flexible member 40, a drive shaft seal 22, rollers 30, a cage 36, and an outer race 32. All of these parts must be correctly aligned relative to one another and secured in place. Further, the outer surface of the flexible member is restrained or positionally stabilized from movement relative to the vehicle. This is done by the mounting brackets 56 and 60 which engage substantially all of the outer surface of the flexible member 40, keeping the outer surface of the flexible member from moving. Supporting the outer surface of the flexible member 40, although necessary for the invention of Groat, adds cost and complexity to the steering shaft bearing assembly 6 and hinders the ability of the flexible member 40 to accommodate movement of the steering shaft 10. Thus, there exists a need for a steering shaft bearing assembly that has fewer parts, is easy to install and remove, that is better able to accommodate movement of the shaft, and/or is inexpensive to manufacture.

SUMMARY OF THE INVENTION

One embodiment of a steering shaft bearing assembly formed in accordance with the present invention for use with a vehicle having a steering shaft is disclosed. The steering shaft bearing assembly includes a bearing having a bore adapted to receive the steering shaft and a support body having an outer surface and a passageway passing through the support body. The bearing is at least partially disposed in the passageway so as to be suspended by the support body in the passageway in a predetermined position. The support body comprises a flexible material for permitting the bearing to move from the predetermined position. About 50% or more of the outer surface of the support body is free of a rigid support structure for restricting movement of the support body when coupled to the vehicle during operation.

Another embodiment of a steering shaft bearing assembly formed in accordance with the present invention for a vehicle having a steering shaft is disclosed. The steering shaft bearing assembly includes a bearing having a bore adapted to rotatingly receive the steering shaft and a support body. The support body is adapted to be coupled to the vehicle and includes a passageway housing the bearing. The support body comprises a flexible material for permitting the bearing to move from a predetermined position. A mounting flange is coupled to the support body, the mounting flange adapted to be coupled to the vehicle to anchor the support body to the vehicle. The bearing, support body, and mounting flange are all non-removably coupled to one another.

Still another embodiment of a steering shaft bearing assembly formed in accordance with the present invention for use with a vehicle having a steering shaft is disclosed. The steering shaft bearing assembly includes a bearing having a bore adapted to rotatingly receive a steering shaft of a vehicle and a support body. The support body is formed from a flexible material, the support body disposed about the bearing for permitting the bearing to move from a predetermined position. The steering shaft bearing assembly also includes a mounting flange integrally formed with the support body so as include the flexible material, the mounting flange adapted to be coupled to the vehicle.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
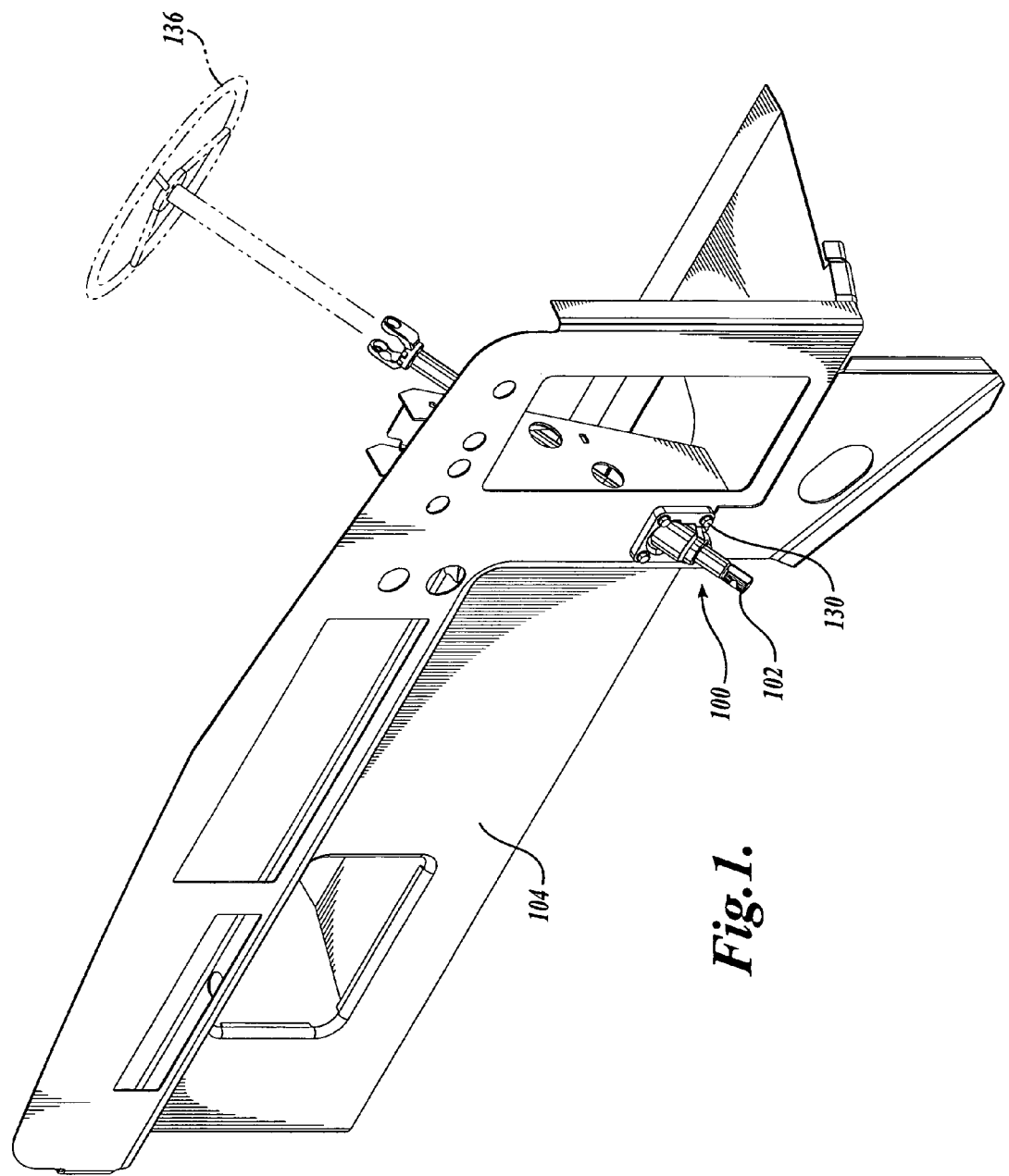
FIG. 1 is a perspective view of one embodiment of a steering shaft bearing assembly formed in accordance with the present invention, the steering shaft bearing assembly depicted attached to a firewall of a vehicle and supporting a steering shaft coupled to a steering wheel of a vehicle.

Referring to FIGS. 1-4, one embodiment of a steering shaft bearing assembly 100 formed in accordance with the present invention is shown and described. Turning to FIG. 1, generally described, the steering shaft bearing assembly 100 provides support for a steering shaft 102 as the steering shaft 102 passes through a firewall 104 of a vehicle (not shown). The distal end of the steering shaft 102 may be coupled to the steering gear (not shown) of the vehicle and the proximal end may be coupled to a steering wheel 136 of the vehicle. The illustrated embodiment of the steering shaft bearing assembly 100 permits limited movement of the steering shaft 102 in an angular and/or radial manner, and unlimited shaft movement in an axial and/or rotational manner. The steering shaft bearing assembly 100 also impedes contaminates, noise, and vibrations from passing through the firewall 104.

Figure 2:
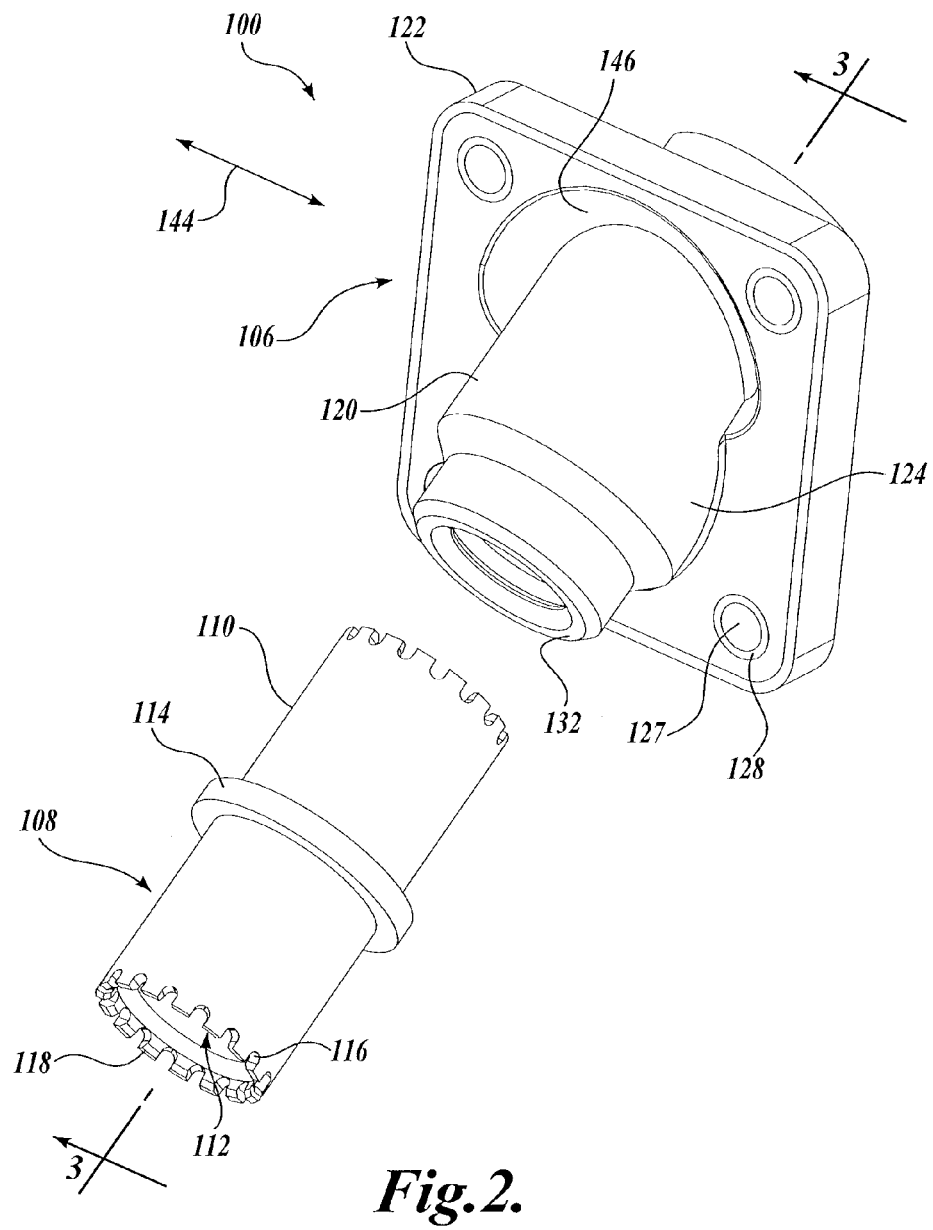
FIG. 2 is an exploded perspective view of the steering shaft bearing assembly of FIG. 1 showing a bearing removed from a bearing housing.
Figure 3:
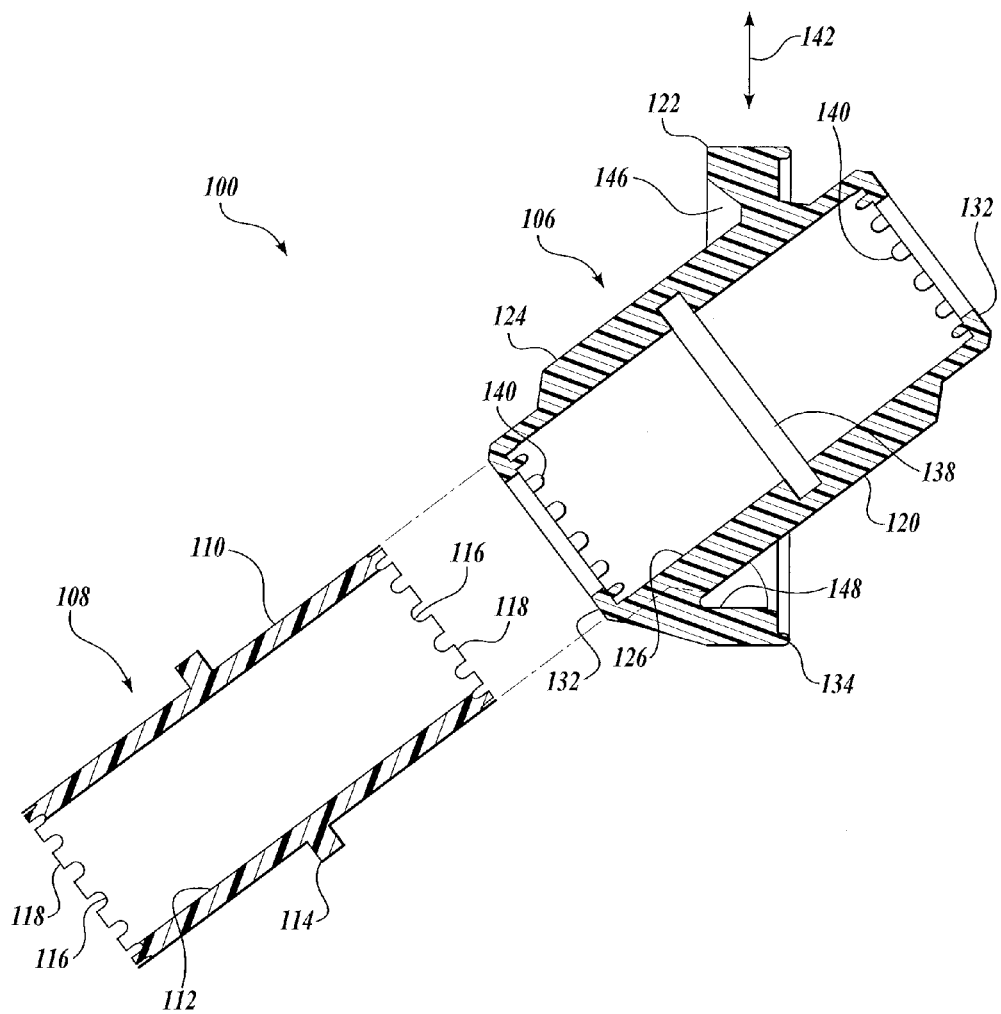
FIG. 3 is a cross-sectional, elevation view of the steering shaft bearing assembly of FIG. 2, the cross-sectional cut taken through Section 3-3 of FIG. 2.

Focusing now in greater detail upon the structure of the steering shaft bearing assembly 100 and turning to FIGS. 2 and 3, the steering shaft bearing assembly 100 includes a bearing housing 106 and a bearing 108. The bearing 108 may be generally cylindrical in shape and have an outer surface 110 and an inner surface defining an inner passageway or bore 112. The bore 112 may be cylindrical in shape and sized to rotatingly receive the steering shaft 102 (See FIG. 1). A protrusion 114 extends outward from the outer surface 110. In the illustrated embodiment, the protrusion 114 is an annular shaped protrusion extending radially outward along a circumference of the outer surface 110. Although a protrusion of a specific shape is illustrated and described, it should be apparent to those skilled in the art that alternately shaped protrusions are suitable for use with and are within the spirit and scope of the present invention, including non-continuous protrusions (i.e., wherein a plurality of protrusions are used that intermittently extend outward from the outer surface so as not to fully encircle the bore), protrusions of other geometric shapes and forms, etc. The protrusion 114 may be used to enhance bonding/retention of the bearing 108 to/within the bearing housing 106, as will be described in more detail following.

The bearing 108 terminates in end surfaces 116, which in the illustrated embodiment, are annular in shape. The end surfaces 116 may include one or more protrusions 118 extending outward from the end surfaces 116. In the illustrated embodiment, the protrusions 118 are formed from a plurality of tines which extend axially outward from the end surfaces 116. Although a protrusion 118 of a specific shape and orientation is illustrated and described, it should be apparent to those skilled in the art that alternately shaped and oriented protrusions are suitable for use with and are within the spirit and scope of the present invention, including protrusions which extend in other than an axially direction and protrusions of other geometric shapes and forms, etc. The protrusions 118 may be used to enhance bonding/retention of the bearing 108 to/within the bearing housing 106, as will be described in more detail following.

The bearing 108 may be made from a rigid or semi-rigid material, such as metal or plastic, one suitable example being acetal. The bearing 108 may be self lubricating, requiring no additional lubrication over a predetermined period, such as the expected useful life of the vehicle. More specifically, the bearing 108 may have a lubricating compound interposed/intermixed with the rigid or semirigid material forming the bearing. For instance, the bearing 108 may be impregnated with a solid lubricant, one suitable example being polytetrafluoroethylene, often sold under the tradename TEFLON.

Although the bearing 108 is illustrated as a bushing style bearing having no moving parts, those skilled in the art will appreciate that the bushing may also be a roller style bearing having rolling elements for facilitating the rotating and support of the steering shaft during rotation.

This detailed description will now focus upon the bearing housing 106. The bearing housing 106 includes a support body 120 and a mounting flange 122. The support body 120 may be generally cylindrical in shape and have an outer surface 124 and an inner surface defining an inner passageway 126. The inner passageway 126 may be cylindrical in shape and sized to receive the bearing 108. In one embodiment, the support body 120 may be molded about the bearing 108 to integrally form or bond the bearing housing 106 to the bearing 108 such that the bearing 108 and bearing housing 106 are integrally and non-removably formed together to form a single piece.

Of note, the protrusions 114 and 118 of the bearing 108 enhance the ability of the support body 120 to bond to the bearing 108. Moreover, the bearing housing 106 includes a recess 138 sized and shaped to receive the protrusion 114 of the bearing 108. Thus, in the illustrated embodiment, the recess 138 is an annular shaped channel extending radially outward along an inner circumference of the inner passageway 126. Although a recess of a specific shape is illustrated and described, it should be apparent to those skilled in the art that alternately shaped recesses are suitable for use with and are within the spirit and scope of the present invention, including non-continuous recesses (i.e., wherein a plurality of recesses are used that intermittently extend outward from the inner surface of the inner passageway 126 so as not to fully encircle the inner passageway), recesses of other geometric shapes and forms, etc. The recess 138 interfaces with the protrusions 114 to enhance bonding/retention of the bearing 108 to/within the bearing housing 106. Further, the interlocking of the recess 138 of the bearing housing 106 with the protrusion 114 of the bearing 108 aids in impeding movement of the bearing 108 relative to the bearing housing 106, such as in an axial manner.

The bearing housing 106 also includes a plurality of protrusions 140 each adapted to be received between adjacent protrusions 118 of the bearing 108. In the illustrated embodiment, the protrusions 140 are formed from a plurality of tines which are axially aligned and which extend inward from the inner passageway 126 of the bearing housing 106. The protrusions 140 are sized and shaped to be cooperatively received or interlock between the protrusions 118 of the bearing 108. Although protrusions 140 of a specific shape and orientation are illustrated and described, it should be apparent to those skilled in the art that alternately shaped and oriented protrusions are suitable for use with and are within the spirit and scope of the present invention, including protrusions which are other than axially aligned and which have other geometric shapes and forms, etc. The protrusions 140 interface with the protrusions 118 to enhance bonding/retention of the bearing 108 to/within the bearing housing 106. Further, the interlocking of the protrusions 140 of the bearing housing 106 with the protrusions 118 of the bearing 108 aid in impeding movement of the bearing 108 relative to the bearing housing 106, such as in a rotational or axial manner.

Although the bearing 108 is described as being non-removably received/bonded to the bearing housing 106, it should be apparent to those skilled in the art that the bearing 108 may be removably received by the bearing housing 106. For instance, the bearing 108 may be axially slid within the inner passageway 126 until the recess 138 and protrusions 140 of the bearing housing 106 interlock with the protrusions 114 and 118 of the bearing 108 to impede movement, such as rotational or axial movement, of the bearing 108 relative to the bearing housing 106.

Figure 4:
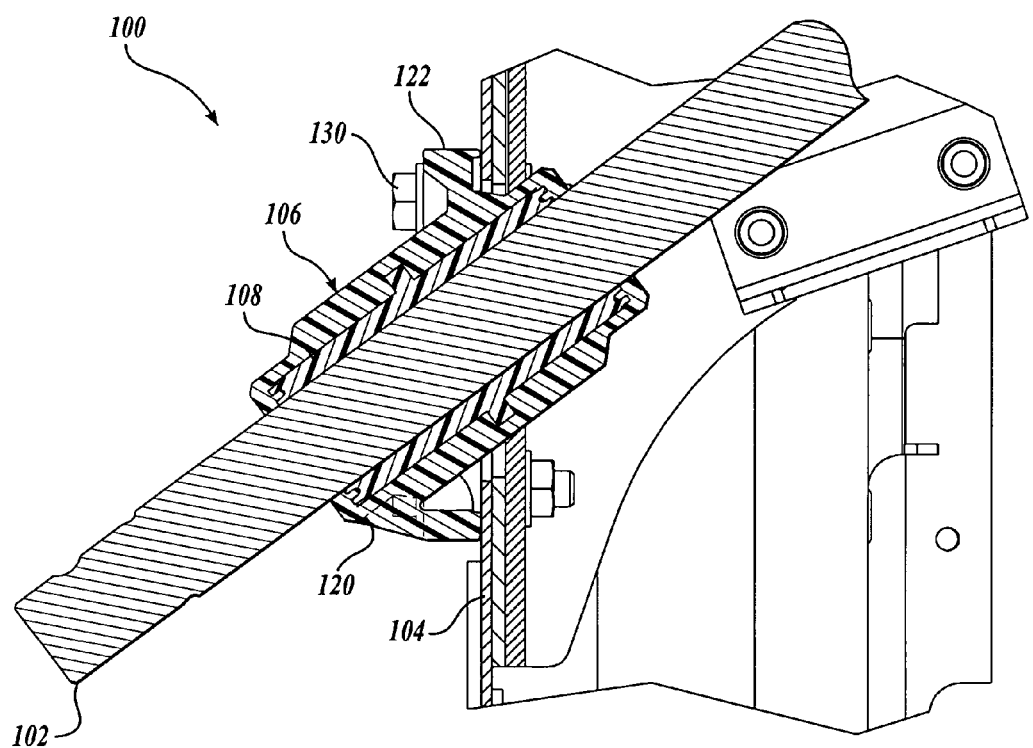
FIG. 4 is a cross-sectional, elevation view of the steering shaft bearing assembly, steering shaft, and firewall of FIG. 1, the cross-sectional cut taken along a vertical plane containing the centerline of the steering shaft bearing assembly.

Turning to FIGS. 2 and 4, coupled to the support body 120 is the mounting flange 122. The mounting flange 122 facilitates the coupling of the bearing housing 106 to the vehicle. The mounting flange 122 extends outward from the outer surface 124 of the support body 120 and includes a plurality of mounting apertures 127 passing through the mounting flange 122 to permit fasteners 130 to pass therethrough when the mounting flange 122 is coupled to the firewall 104 of the vehicle. The apertures 127 may include mounting bushings 128 made from a rigid material for reinforcing the apertures 127 and for transferring any clamping forces applied by the fasteners 130 to the firewall 104 of the vehicle. The mounting apertures 127 permit the bearing housing 120 to be directly mounted to the firewall 104 without additional clamping hardware other than the fasteners 130 (i.e., no clamping plate or other hardware is needed).

Although a mounting flange that is rectangular in shape and planar is illustrated and described, it should be apparent to those skilled in the art that the mounting flange may take any geometric shape or combination of geometric shapes, and may be contoured so as to be non-planar without departing from the spirit and scope of the present invention. Further, although the illustrated and described mounting flange is shown as being coupled to the firewall via four fasteners passing through four mounting apertures, it should be apparent to those skilled in the art that the mounting flange may be mounted to any structure of the vehicle using any suitable fastening assembly, a few suitable examples being clamps and quick connect systems, for instance bayonet styled quick connect systems, without departing from the spirit and scope of the present invention.

Referring to FIGS. 2 and 3, the bearing housing 106, which includes the support body 120 and the mounting flange 122, may be formed from a flexible material, a few suitable examples being rubber or polymers, such as urethane. The flexibility of the bearing housing 106 allows the bearing 108 to move angularly from an initial centered position to permit limited angular motion of the steering shaft 102. The steering shaft 102 may also move rotationally and axially in an unlimited manner through the bearing 108.

The bearing housing 106 may also include a pair of shaft seals 132 which act to prevent intrusion of air, liquid, solid contaminates, and noise where the steering shaft 102 passes through the firewall 104. The shaft seals 132 may be located at each end of the support body 120 and extend radially inward from the inner passageway 126 of the support body 120 and sealingly engage the steering shaft 102. The shaft seals 132 may be integrally formed with the support body 120, thereby eliminating the need for a separate sealing device. The inherent toughness of the urethane material of the bearing housing 106 insures adequate seal life.

A sealing bead 134 may be disposed about or near a perimeter of the mounting flange 122. The sealing bead 134 may be used to provide a positive seal between the mounting flange 122 and the firewall 104. Preferably, the sealing bead 134 is integrally and non-removably formed with the mounting flange 122. When the mounting flange 122 is coupled to the firewall, the sealing bead 134, which protrudes outward from the mounting flange 122 a selected distance, becomes compressed against the firewall and selectively conforms to provide a positive seal against the firewall 104 (See FIG. 4) to impede the infiltration of the contaminates, etc.

Referring to FIG. 3, the mounting flange 122 may also be designed to more readily permit movement of the bearing 108 in a first direction, such as in a vertical direction indicated by arrow 142, and more heavily restrain movement of the bearing 108 in a second direction, such as a horizontal direction indicated by arrow 144 in FIG. 2. More specifically, the mounting flange 122 of the illustrated embodiment includes an upper relief recess 146 (best shown in FIG. 2) and a lower relief recess 148.

The upper relief recess 146 is disposed above the support body 120 on a front surface of the mounting flange. The upper relief recess 146 results in a decrease in a thickness of the mounting flange 122 above the support body 120. This decrease in thickness of the mounting flange 122 results in less material able to restrain the support body 120 from movement in a vertical direction. Similarly, the lower relief recess 148 is disposed below the support body 120 on a back surface of the mounting flange. The lower relief recess 148 results in a decrease in a thickness of the mounting flange 122 below the support body 120. This decrease in thickness of the mounting flange 122 results in less material able to restrain the support body 120 from movement in a vertical direction.

Inasmuch as the relief recesses 146 and 148 are disposed above and below the support body 120 and not to the sides of the support body, the ability of the support body 120 to move horizontally is impeded to a greater degree than the ability of the support body 120 to move vertically in the direction of the upper and lower relief recesses 146 and 148. In one embodiment, a force required to move the support body 120 in the first direction a predetermined distance, such as ⅛ inch, is less than about 20% of the force required to move the support body 120 in the second direction the same distance. In other embodiments, the force to move the support body 120 in the first direction the predetermined distance is less than about 30%, 40%, 50%, or 60% of the force required to move the support body the same distance in the second direction.

In the illustrated embodiment, the first and second directions are oriented perpendicular to one another, and in a vertical and a horizontal direction respectively. However, it is noted that it should be apparent to those skilled in the art that the first and second directions need not be perpendicularly oriented to one another nor oriented in a vertical or horizontal direction, since other orientations are suitable for use with, and are within the spirit and scope of the present invention.

In the illustrated embodiment, the bearing housing 106 is of adequate stiffness to provide sufficient stability to the bearing 108, and thus the steering shaft 102, without requiring bracing of the bearing housing 106 with rigid support members disposed about the bearing housing 106, such as encasing or supporting the outer surface of the bearing housing 106 with a rigid sleeve, mounting bracket, support structure, frame, etc., coupled to the firewall to provide positional stability to the outer surface. The bearing housing 106 of the illustrated embodiment provides effective vibration isolation, thereby reducing vibration and noise at the steering wheel.

In light of the above description of the components of the steering shaft bearing assembly 100, the installation and use of the illustrated embodiment of the steering shaft bearing assembly 100 will now be described. Referring to FIGS. 1 and 3, first, the bearing housing 106 is molded about the bearing 108 to permanently mold the bearing housing 106 to the bearing 108. The protrusions 114 and 118 aid in enhancing the adherence of the bearing 108 to the bearing housing 106 and impede movement of the bearing 108 relative to the bearing housing 106. The steering shaft bearing assembly 100 is then removably coupled to the firewall 104 of the vehicle with a plurality of fasteners. The seal bead 134 is compressed against the firewall 104 sealing the bearing housing 106 to the firewall 104. The steering shaft 102 is then rotatingly received within the bore 112 defined by the bearing 108. The end seals 132 rotatingly and sealingly engage the steering shaft 102 to impede the passage of contaminates and noise along the steering shaft 102 and into the steering shaft bearing assembly 100 and/or vehicle.

During use, the bearing housing 106 supports the bearing 108 in a predetermined position, such as a centered or default position. When vehicle operation (such as an adjustment to an angle (tilt) of a steering wheel) causes the steering shaft 102, and thus the bearing 108, to be moved angularly out of alignment with the predetermined position, the bearing housing 106 deforms to permit the bearing to move from the predetermined position. Moreover, movement of the bearing 108 from the predetermined position causes portions of the flexible material of the bearing housing 106 to be compressed and/or stretched, thereby accommodating movement of the bearing from the predetermined position. The relief recesses 146 and 148 permit the bearing 108 to move more readily, i.e. with less force, in a vertical direction relative to a horizontal direction.

During use, the support body 120 of the bearing housing 106 is anchored to the vehicle by the mounting flange 122, such that the outer surface 124 of the support body 120 is substantially free of any support structure coupled to the vehicle for providing positional stability to the support body 120. In one embodiment, 50% or more of the outer surface of the support body is free of a rigid outer support structure for restricting movement of the support body when coupled to the vehicle during operation. In other embodiments, higher percentages of the outer surfaces are free of a support structure, such as about 60%, 70%, 80%, and 90% or more. For the purposes of this detailed description, the outer surface of the support body 120 is defined as the surface area of the support body 120 which is disposed radially outward from the bearing 108, excluding any surface area of the mounting flange 122.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A steering shaft bearing assembly for a vehicle having a steering shaft comprising:
   (a) a bearing having a bore adapted to rotatingly receive the steering shaft of the vehicle;
   (b) a support body having
      an outer surface and
      a passageway passing through the support body,
      wherein the bearing is at least partially disposed in the passageway so as to be suspended by the support body in the passageway in a predetermined position and
      wherein the support body comprises a flexible material for permitting the bearing to move from the predetermined position; and
   (c) a flexible mounting flange extending from the support body, the mounting flange having an upper relief recess formed on a front surface of the mounting flange and a lower relief recess formed on a back surface of the mounting flange, the upper and lower relief recesses permitting the support body to move with less resistance in a first direction as compared to movement in a second direction.

2. The steering shaft bearing assembly of claim 1, wherein about 90% or more of the total surface area of the outer surface of the support body is free of a rigid support structure.

3. The steering shaft bearing assembly of claim 1, wherein the bearing is capable of moving in an angular direction from the predetermined position.

4. The steering shaft bearing assembly of claim 1, wherein the support body includes a seal integrally formed with the support body and adapted to sealingly engage the steering shaft to impede contaminates passing between the seal and the steering shaft when the steering shaft is received within the bearing.

5. The steering shaft bearing assembly of claim 1, wherein the support body is integrally and non-removably coupled to a flexible mounting flange, wherein the flexible mounting flange is adapted to be coupled to the vehicle.

6. The steering shaft bearing assembly of claim 5, wherein the support body is anchored to the vehicle solely through the flexible mounting flange when the flexible mounting flange is coupled to the vehicle.

7. The steering shaft bearing assembly of claim 5, wherein the flexible mounting flange includes a sealing bead integrally formed with the flexible mounting flange and adapted to seal the flexible mounting flange against the vehicle when the flexible mounting flange is coupled to the vehicle.

8. The steering shaft bearing assembly of claim 1, wherein the bearing includes a cylindrical body having an outer surface and a protrusion extending outward from the outer surface of the cylindrical body to impede axial movement of the bearing relative to the support body.

9. The steering shaft bearing assembly of claim 1, wherein the bearing includes a cylindrical body having an annular end surface, wherein a plurality of protrusions extend outward from the annular end surface.

10. The steering shaft bearing assembly of claim 1, wherein the bearing comprises a rigid or semi-rigid material impregnated with a solid lubricant.

11. The steering shaft bearing assembly of claim 1, wherein about 50% or more of a total surface area of the outer surface of the support body is free of a rigid support structure.

12. A steering shaft bearing assembly for a vehicle having a steering shaft comprising:
   (a) a bearing having a bore adapted to rotatingly receive the steering shaft;
   (b) a support body adapted to be coupled to the vehicle and including a passageway housing the bearing, wherein the support body comprises a flexible material for permitting the bearing to move from a predetermined position; and
   (c) a mounting flange of a flexible material coupled to the support body, the mounting flange having relief recesses formed on an upper relief recess formed on a front surface of the mounting flange and a lower relief recess formed on a back surface of the mounting flange, the upper and lower relief recesses permitting the support body to move with less resistance in a vertical direction as compared to movement in a horizontal direction.

13. The steering shaft bearing assembly of claim 12, wherein the support body is anchored to the vehicle solely through the mounting flange when the mounting flange is coupled to the vehicle.

14. The steering shaft bearing assembly of claim 12, wherein the support body is formed from urethane and the bearing is formed from plastic.

15. The steering shaft bearing assembly of claim 14, wherein the support body is molded to the bearing.

16. The steering shaft bearing assembly of claim 12, wherein the mounting flange includes a sealing bead integrally formed with the mounting flange and adapted to seal the mounting flange against the vehicle when the mounting flange is coupled to the vehicle.

17. A steering shaft bearing assembly for a vehicle having a steering shaft comprising:
   (a) a bearing having a bore adapted to rotatingly receive the steering shaft of the vehicle;
   (b) a support body formed from a flexible material, the support body disposed about the bearing for permitting the bearing to move from a predetermined position; and
   (c) a mounting flange integrally formed with the support body and formed from the flexible material, the mounting flange adapted to be coupled to the vehicle and having an upper relief recess formed on a front surface of the mounting flange and a lower relief recess formed on a back surface of the mounting flange, the upper and lower relief recesses permitting the support body to move with less resistance in a first direction as compared to movement in a second direction.

18. The steering shaft bearing assembly of claim 17, having one or more apertures passing through the mounting flange, each aperture adapted to permit a fastener to pass therethrough to aid in coupling the flexible support body to the vehicle.

19. The steering shaft bearing assembly of claim 17, wherein the support body includes an outer surface, wherein the mounting flange extends outward from the support body to form the mounting flange.

20. The steering shaft bearing assembly of claim 17, wherein the support body is anchored to the vehicle solely through attachment of the mounting flange to the vehicle when the mounting flange is coupled to the vehicle.

21. The steering shaft bearing assembly of claim 17, wherein the support body is coupled to the mounting flange and forces exerted upon the support body by the bearing are transferred to the vehicle via the mounting flange and not by a support structure coupled to the vehicle and engaged with the support body.

22. The steering shaft bearing assembly of claim 17, wherein the mounting flange includes a sealing bead integrally formed with the mounting flange and adapted to seal the mounting flange against the vehicle when the mounting flange is coupled to the vehicle.

23. A steering shaft bearing assembly for a vehicle having a steering shaft comprising:
(a) a flexible support body having an outer surface and a passageway passing through the support body;
(b) a bearing disposed within the passageway of the support body and having a bore adapted to receive the steering shaft of the vehicle; and
(c) a flexible mounting flange coupled to the flexible support body, the flexible mounting flange having an upper relief recess formed on a front surface of the mounting flange and a lower relief recess formed on a back surface of the mounting flange, the upper and lower relief recesses permitting the support body to move with less resistance in a vertical direction as compared to movement in a horizontal direction.

* * * * *

UNITED STATES PATENT AND TRADEMARK OFFICE
CERTIFICATE OF CORRECTION

PATENT NO. : 7,272,989 B2  Page 1 of 1
APPLICATION NO. : 11/112239
DATED : September 25, 2007
INVENTOR(S) : S.J. Schuh It is certified that error appears in the above-identified patent and that said Letters Patent is hereby corrected as shown below:

| COLUMN | LINE | |
|---|---|---|
| 8 | 31-32 | after "the mounting flange having" delete "relief |
| (Claim 12, | lines 11-12) | recesses formed on" |

Signed and Sealed this

First Day of April, 2008

JON W. DUDAS
*Director of the United States Patent and Trademark Office*